Nov. 24, 1942.    M. J. MALONE    2,303,056
GROUND CIRCUIT TESTING DEVICE
Filed June 18, 1940
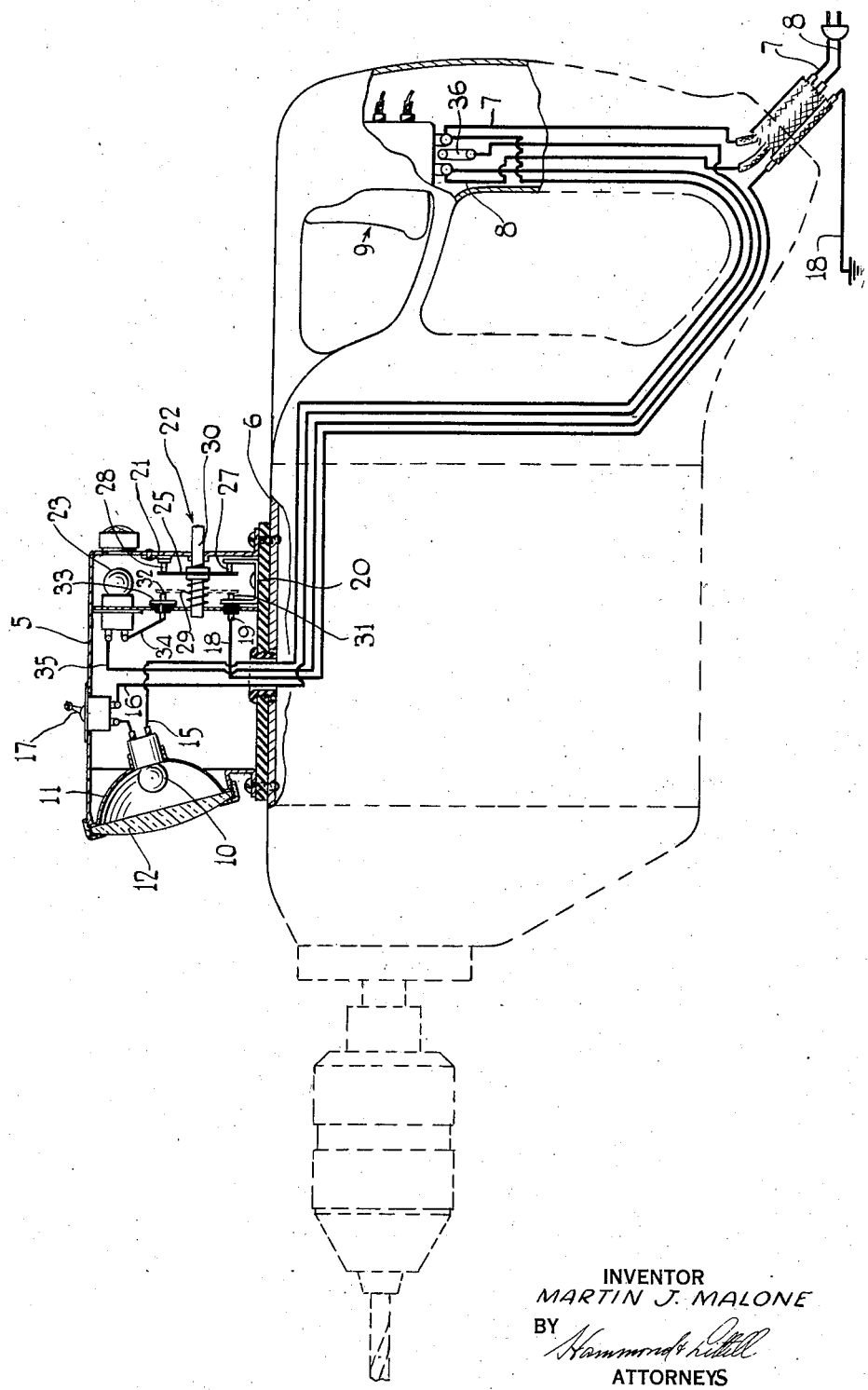
INVENTOR
MARTIN J. MALONE
BY
Hammond & Littell
ATTORNEYS Patented Nov. 24, 1942

2,303,056

UNITED STATES PATENT OFFICE 2,303,056

GROUND CIRCUIT TESTING DEVICE

Martin Joseph Malone, Laurelton, Long Island, N. Y.

Application June 18, 1940, Serial No. 341,106

7 Claims. (Cl. 177—311)

The present invention relates to tools and apparatus of various types using electrical current, and more particularly to safety devices designed to protect the operator from electrical shock.

The invention has been developed more particularly in connection with the design of portable tools and appliances and for the purposes of disclosure of the principles of the invention such an embodiment will be more particularly described. It will be understood, however, that the particular description is illustrative merely and is not intended as defining the limits of the invention. In the use of electrical tools and appliances a difference of potential sometimes develops between the casing or handle of the tool and the ground, whereby the operator handling the same receives an electrical shock. This may be due to a short circuit developed within the apparatus itself, or it may involve a defect in the current supply whereby an abnormally high voltage is impressed upon the device. It may be that merely a static charge is developed. The effects in practice range from the mere annoyance of slight static shocks to serious injuries.

In order to reduce the danger resulting from this condition, it is a common practice to provide a ground connection between the casing or other parts of the apparatus and ground. For this purpose a conductor is provided connected at one end to the casing and attachable at its free end to a suitable grounded element.

Serious accidents sometimes occur due to a defect in the ground connection. The defect may be in the conductor or connections, or may be due to the fact that the connection is made to some element, which is, in fact, insulated from the ground.

The present invention aims to provide an arrangement whereby the operator may conveniently and easily test the ground connection and thus avoid the danger of annoyance or injury.

The invention aims also so to arrange the testing device that it may be carried as a permanent part of the apparatus and may be operated at any time to check the ground connection without necessarily discontinuing the use of the apparatus.

The nature and objects of the invention will be better understood from a description of a particular illustrative embodiment thereof, for the purposes of which description reference should be had to the accompanying drawing forming a part hereof and in which—

The figure is a central sectional view showing a testing arrangement applied to an electric drill.

In the arrangement illustrated an auxiliary casing 5 is attached to the main casing 6 of an electric drill. As here shown, power is supplied to the drill by two conductors 7, 8 leading to suitable terminals of a main switch 9, which controls the power to the drill motor. A lamp 10 is shown as provided in the auxiliary casing in suitable position to throw light on the work. A reflector 11 of usual type, and a lens 12 are arranged as usual. Two conductors 15, 16 lead from the terminals of the switch 9 to supply current to the lamp 10 and one of these conductors is interrupted by a control switch 17 positioned for convenient operation.

In order to avoid accidental shock to the operator a ground connection conductor 18 is suitably connected with the casing 5 to maintain the ground connection for the casing during operation of the tool. In the arrangement shown, the conductor 18 is connected by a binding post 19 to a bracket 20 carried by, but insulated from, the casing 5. A second bracket 21 is also carried by the casing and in permanent electrical contact therewith. During operation this ground connection is maintained normally closed through a switch 22. This switch, however, may be operated to close a signal circuit through signal lamp 23. Preferably it disconnects the ground conductor from the casing when it closes the signal lamp circuit. As shown, the switch 22 comprises a bar 25 which in the position shown engages the contacts 27 and 28 carried respectively by the bracket 20 and the bracket 21. This position of the switch is normally maintained by spring 29. When the push button 30 forming part of the switch is pressed by the operator, the bar 25 engages the contacts 31, 32 carried respectively by the bracket 20 and a bracket 33, which is insulated from the casing 5. One terminal of the lamp 23 is connected to the contact 32 by a conductor 34. The other terminal is connected by a conductor 35 to one terminal of the current supply. Inasmuch as the current may be supplied by two conductors one of which is at substantially zero potential, and the other of which is at a different potential, it will be understood that this arrangement of signal lamp and switches may be used to determine whether the plug by which the tool is connected to the power supply line is suitably connected or should be reversed. However, a switch 36 may be provided whereby conductor 35 may be connected alternatively to either of the two power conductors 7 and 8. By this arrangement if the signal lamp 23 is not energized when the switch 30 is pressed by the operator, the switch 36 may be moved to make connection with the other conductor. Whichever of the conductors 7 and 8 is the high potential conductor, it may thus be connected to the signal lamp 23. If a polarized plug is used, the switch 36 is unnecessary.

In operation, when the drill is connected for use, the operator will press the push button 30 to close the circuit through the power supply conductor, the signal lamp 23 and the ground connection 18. If the signal lamp is energized, then the operator knows that his ground connection to the casing is satisfactory. If, on the other hand, the signal lamp does not light, then he knows that the ground connection is imperfect, or that his power connection should be reversed. He will then throw the switch 36 to connect the other conductor and again press the push button 30 to determine if the ground connection should be improved.

If the conditions of operation require occasional testing of the ground connection during use of the tool, the operator can easily press the push button 30 to again test the ground connection and this may be done, if desired, without interfering with the continuing operation of the tool.

It will be understood that various changes in the arrangement shown may be made without departing from the spirit of the invention, and that the principles involved may be applied to many types of apparatus, wherein it is desired to have assurance that a suitable ground is maintained.

I claim:

1. In an electrically operated tool, a main casing, an auxiliary casing attachable thereto, power supply conductors carried by said main casing, a ground conductor carried by one casing, a signal lamp carried by said auxiliary casing, means including a conductor and a switch for connecting the signal lamp to either power supply conductor, and means including a second switch for connecting said ground conductor alternatively to said signal lamp to close an electrical circuit to energize the signal lamp or to said auxiliary casing to ground said auxiliary casing.

2. In an electrically operated tool, a casing, an electrical power supply conductor carried by the casing, a ground conductor carried by the casing and adapted to be connected to ground, a signal lamp, and a switch arranged in one position to close a circuit through the power supply conductor, the lamp and the ground conductor, and in another position to connect the ground conductor to the casing.

3. In an electrically operated tool, a tool casing, conductors for supplying current to the tool, a signal lamp, a ground conductor, a switch arranged in one position to close a circuit through one supply conductor, the signal lamp and the ground conductor and in another position to connect the casing to the ground conductor.

4. In an electrically operated tool, a main casing, an auxiliary casing attachable thereto, a motor, power supply conductors entering said main casing but insulated therefrom to supply current to said motor, a ground conductor carried by said main casing, a signal lamp carried by said auxiliary casing, means including a conductor and a switch for connecting the signal lamp to either power supply conductor, and means for testing the circuits including a second switch for connecting said ground conductor alternatively to said signal lamp to close an electrical circuit to energize the signal lamp or to said auxiliary casing to ground said auxiliary casing.

5. An electrically operated tool, comprising in combination a tool casing, a motor and tool carried thereby, an auxiliary casing attached to said first-mentioned casing with insulation material between said casings, power supply conductors entering said casings but insulated therefrom, a ground conductor carried by the first-mentioned casing and arranged to connect the same to ground, means for testing the electrical connections comprising a signal lamp carried by the auxiliary casing, a conductor and a switch for connecting the signal lamp to either of two power supply conductors and a second switch for connecting the ground conductor alternatively to the signal lamp to close an electric circuit to energize the signal lamp or to connect the auxiliary casing to ground.

6. In a portable electrically operated tool, a casing, an electrical power supply conductor carried by the casing, a ground conductor carried by the casing and adapted to be connected to ground, means operable manually at will for testing the ground conductor circuit comprising a signal lamp having two terminals, means for connecting one terminal of the signal lamp to the power supply conductor, and a switch arranged to connect the ground conductor alternatively to the casing or to the other terminal of the signal lamp.

7. In a portable electrically operated tool, a main casing, an auxiliary casing attachable thereto, power supply conductors carried by said main casing, a ground conductor carried by one casing, a signal lamp carried by said auxiliary casing, means including a conductor and a switch for connecting the signal lamp to either power supply conductor, and means operable manually at will including a second switch for connecting said ground conductor alternatively to said signal lamp to close an electrical circuit to energize the signal lamp or to said auxiliary casing to ground said auxiliary casing.

MARTIN JOSEPH MALONE.